(12) United States Patent
Turner et al.

(10) Patent No.: US 7,243,665 B1
(45) Date of Patent: Jul. 17, 2007

(54) SPRAY-TYPE AUTOMOTIVE WHEEL WASHER

(75) Inventors: Barry S. Turner, Novi, MI (US); David L. Tognetti, Howell, MI (US); Mark D. Morin, Plymouth, MI (US)

(73) Assignee: Belanger, Inc., Northville, MI (US)

( * ) Notice: Subject to any disclaimer, the term of this patent is extended or adjusted under 35 U.S.C. 154(b) by 464 days.

(21) Appl. No.: 10/835,300

(22) Filed: Apr. 28, 2004

(51) Int. Cl.
*B08B 3/00* (2006.01)

(52) U.S. Cl. ............... 134/123; 134/198; 134/100.1

(58) Field of Classification Search ............ 134/123, 134/199, 100.1, 198; 239/556, 557, 558, 239/567, DIG. 4; 15/DIG. 2
See application file for complete search history.

(56) References Cited

U.S. PATENT DOCUMENTS

| | | | | |
|---|---|---|---|---|
| 1,586,997 A | * | 6/1926 | Hull | 239/77 |
| 1,867,634 A | * | 7/1932 | Synder | 134/172 |
| 1,910,497 A | * | 5/1933 | Peik | 451/89 |
| 3,108,608 A | * | 10/1963 | Mahowald | 134/198 |
| 3,322,347 A | * | 5/1967 | Pierce | 239/73 |
| 3,448,717 A | * | 6/1969 | Kuhlman | 118/680 |
| 3,545,460 A | * | 12/1970 | Daum et al. | 134/123 |
| 3,628,212 A | | 12/1971 | Van Brakel | |
| 3,662,417 A | * | 5/1972 | Fuhring et al. | 15/53.4 |
| 3,679,134 A | | 7/1972 | Nixon | |
| 3,721,252 A | * | 3/1973 | Ayella | 134/122 R |
| 3,780,812 A | * | 12/1973 | Lambert | 169/15 |
| 3,857,515 A | | 12/1974 | Zennie | |
| 3,915,179 A | * | 10/1975 | Casson | 134/45 |
| 4,013,222 A | | 3/1977 | Travaglio | |
| 4,269,141 A | * | 5/1981 | Kennett | 118/708 |
| 4,871,084 A | * | 10/1989 | Robbins | 137/363 |
| 4,878,262 A | * | 11/1989 | Stufflebeam et al. | 15/53.4 |
| 4,971,084 A | * | 11/1990 | Smith et al. | 134/45 |
| 4,985,957 A | * | 1/1991 | Belanger et al. | 15/53.4 |
| 5,011,540 A | * | 4/1991 | McDermott | 134/23 |
| 5,152,459 A | * | 10/1992 | Boeh | 239/273 |
| 5,188,293 A | * | 2/1993 | Burton | 239/1 |

(Continued)

FOREIGN PATENT DOCUMENTS

DE 24 26 415 * 12/1975

(Continued)

OTHER PUBLICATIONS

WIPO WO 92/14557 Mar. 1992.*

*Primary Examiner*—Frankie L. Stinson
(74) *Attorney, Agent, or Firm*—Young & Basile, PC

(57) ABSTRACT

An automotive wheel washer comprising a circular conduit having a diameter of approximately 12 to 20 inches and further provided with a plurality of circumferentially spaced nozzles which direct cleaning fluid and chemicals laterally of the wheel washer and toward the adjacent wheel in an inwardly converging fashion. An additional 360° center nozzle produces an outwardly diverging spray pattern which, in combination with the plurality of spaced outer nozzles, is effective to cause direct application of cleaning chemicals to all surfaces of a wheel and reduce the shadowing effect caused by intricate wheel structure patterns. Foaming is created by a porous material in a foaming chamber serving as a common inlet to all nozzles and further having a high pressure air inlet. The circular conduit may be made of plastic or stainless steel or any of a number of essentially equivalent materials.

12 Claims, 3 Drawing Sheets

U.S. PATENT DOCUMENTS

| | | | | |
|---|---|---|---|---|
| 5,312,047 | A * | 5/1994 | Akers | 239/276 |
| 5,573,024 | A | 11/1996 | DeVaney et al. | |
| 5,577,668 | A * | 11/1996 | King et al. | 239/559 |
| 5,778,908 | A * | 7/1998 | Shelstad | 134/123 |
| 5,868,860 | A * | 2/1999 | Asplund | 134/22.1 |
| 6,129,290 | A * | 10/2000 | Nikkanen | 239/2.2 |
| 6,267,308 | B1 | 7/2001 | Hall | |
| 6,270,586 | B1 * | 8/2001 | Soble | 134/32 |
| 6,502,765 | B1 * | 1/2003 | Chase | 239/227 |
| 6,630,198 | B2 * | 10/2003 | Ackerman et al. | 427/239 |
| 6,752,161 | B2 * | 6/2004 | Hernandez | 134/113 |

FOREIGN PATENT DOCUMENTS

| | | | |
|---|---|---|---|
| JP | 6-72293 | * | 3/1994 |

* cited by examiner

SPRAY-TYPE AUTOMOTIVE WHEEL WASHER

FIELD OF THE INVENTION

This invention relates to automotive wheel washers and particularly to a wheel washer using a circular array of spray nozzles to apply cleaning fluids to automotive wheels during a vehicle washing operation.

BACKGROUND OF THE INVENTION

The retail washing of automotive vehicles is a high-dollar volume business in the United States and in many other countries where a high percentage of the population owns automotive vehicles. It is common for retail vehicle laundries to include one or more wheel washers on both sides of the washing area.

A problem associated with wheel washing is created by the intricate patterns found on the wheels which are either sold as original equipment or custom aftermarket purchase to make automobiles more attractive; i.e., such wheels often have intricate patterns of spokes, struts and openings which tend to "shadow" or block the spray pattern from conventional wheel washers from reaching many of the inside areas of the wheel. Unless such areas are substantially directly contacted by the wheel washer fluids and chemicals, these areas will not be cleaned and the customer may be less satisfied with the performance of the retail vehicle laundry.

SUMMARY OF THE INVENTION

A principal objective of the present invention is to provide an automotive wheel washer for use in retail automotive laundries and other installations where vehicles are being washed wherein the spray pattern is such as to increase the likelihood that all visible areas of an automotive wheel, regardless of the complexity of the wheel structure, will be directly contacted by fluid and/or fluid/chemical spray coming from a wheel washer which is disposed adjacent the wheel when the vehicle is in a particular washing area.

In general, the wheel washer of the present invention accomplishes this and other objectives by providing a circular array of spray nozzles having slightly inwardly directed spray patterns. In the preferred embodiment, such a circular array is provided by a circular fluid conduit having a fluid input and a plurality of spaced outlets, such conduit being of a diameter in the range of about 12 to 20 inches so as to approximate the diameter of the wheels which are standard on current passenger automobiles. A plurality of spray nozzles having linear spray patterns are mounted to the spaced outlets so as to spray laterally of the conduit; i.e., toward the wheel, in an inwardly converging pattern. A center spray nozzle is further provided at approximately the center of the conduit and emits fluid in an outwardly diverging 360° spray pattern. Means are provided for supplying fluid and/or chemical to both the conduit input and the center spray nozzle to cause simultaneous high pressure fluid flow from all of the nozzles.

In the preferred embodiment, a foaming chamber is provided and is commonly connected to both the conduit and the center spray nozzle and is further provided with porous material and a high pressure air supply so as to cause a foaming effect which directs the fluid/chemical combination through the various nozzles toward the wheel. It has been found that the combination of an inwardly converging and outwardly diverging spray pattern is effective to contact all visible wheel surface areas essentially independently of the complexity of the wheel structure design.

It has been found that the conduit may be made of any of several shape-retaining materials including both plastic and stainless steel, the latter being preferred for durability and long life. Where plastic is used for the conduit, nozzles may be attached using commercially available clamps. Where the conduit is made of stainless steel or similar material, the nozzles are preferably attached by drilling tapping holes in the conduit.

Other applications of the present invention will become apparent to those skilled in the art when the following description of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein:

FIG. 4 illustrates a detail of the washer showing the manner in which nozzles may be attached to a metal conduit.

DETAILED DESCRIPTION OF THE ILLUSTRATIVE EMBODIMENT

Figure 1:
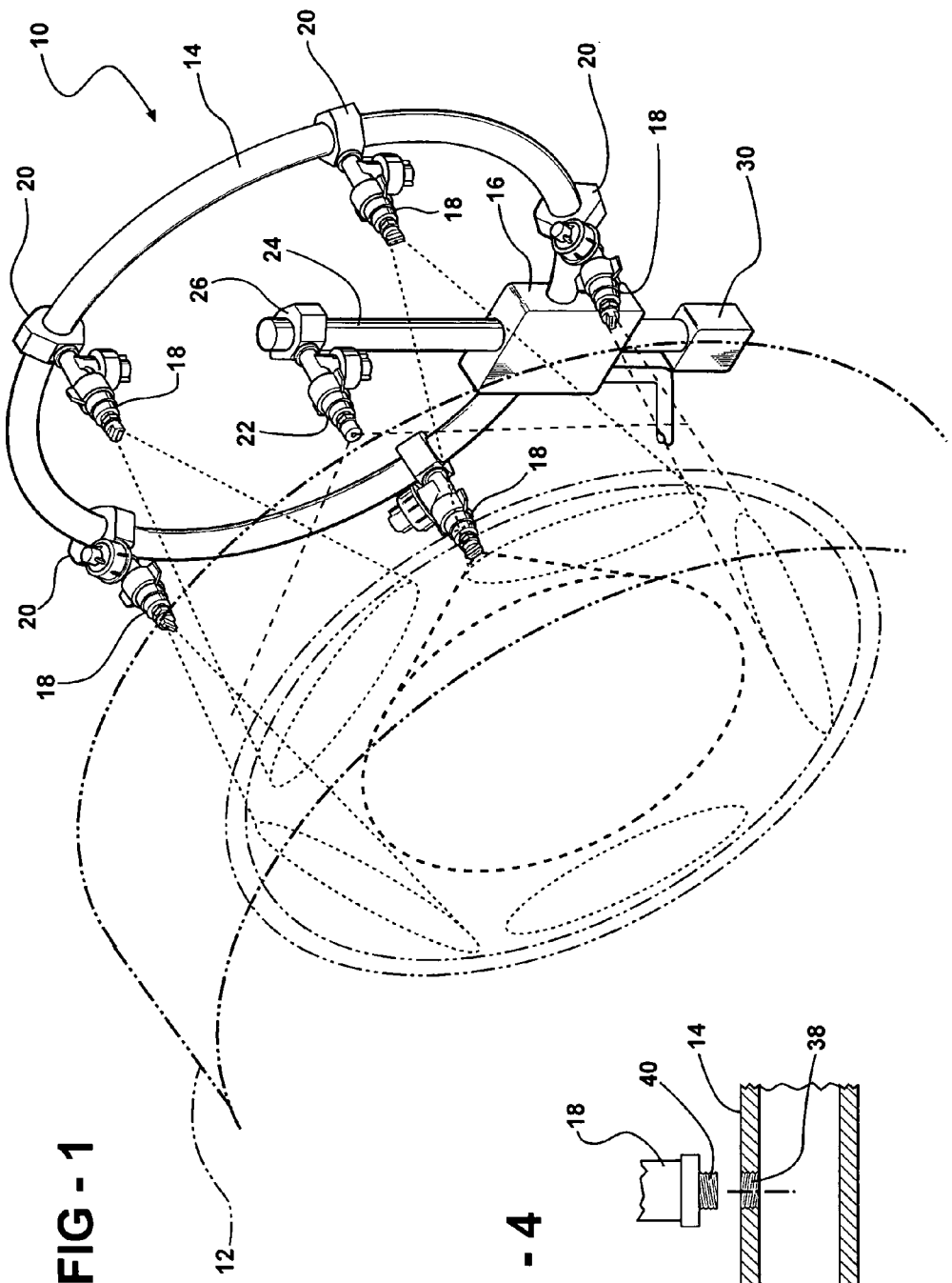
FIG. 1 is a perspective view of a wheel washer constructed in accordance with the invention adjacent a wheel, shown in phantom, being washed and illustrating the converging/diverging pattern of a spray.
Figure 2:
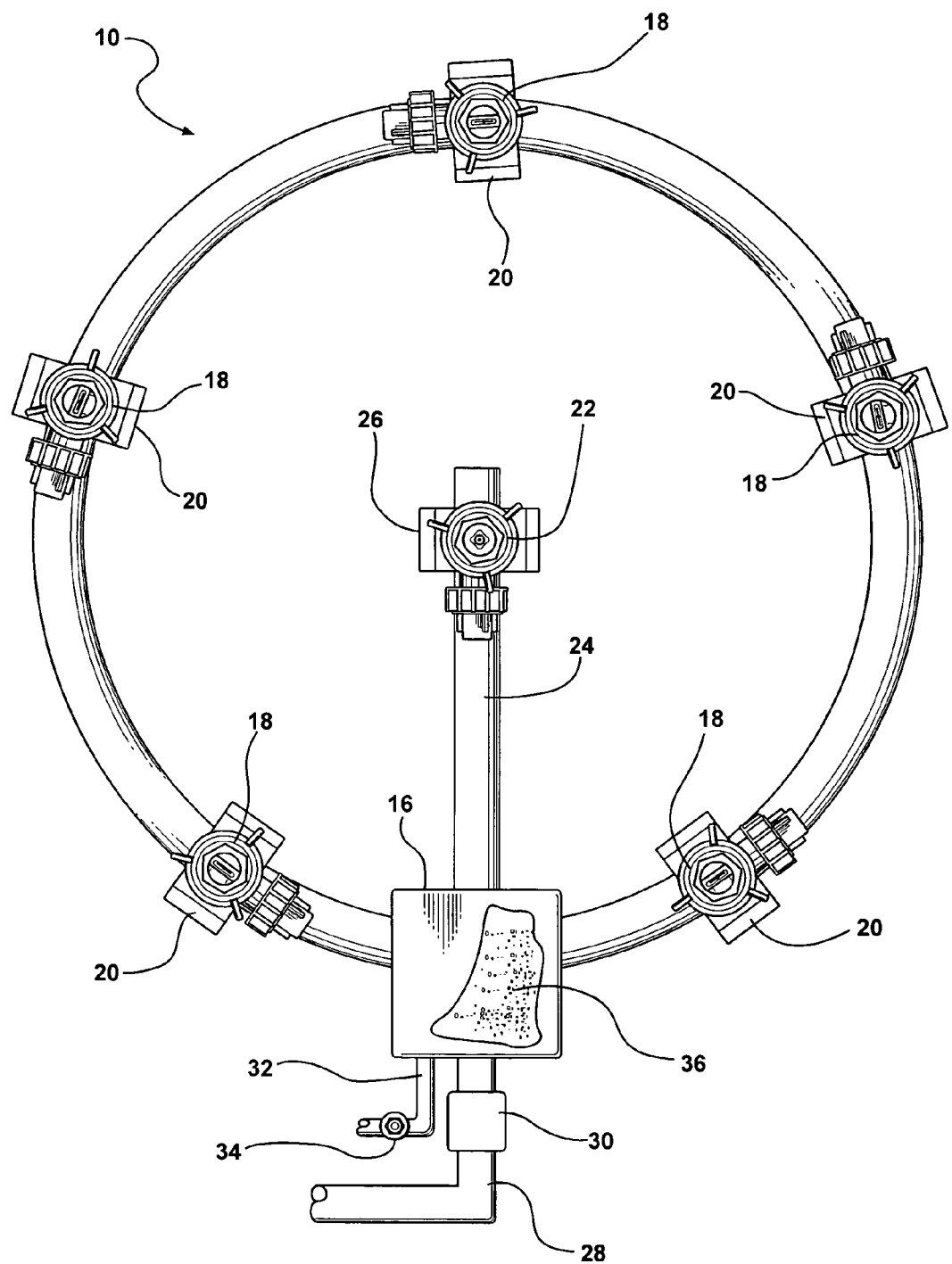
FIG. 2 is a plan view of the wheel washer of FIG. 1 with the nozzles aimed directly at the observer and showing the presence of the porous material in the foaming chamber.
Figure 3:
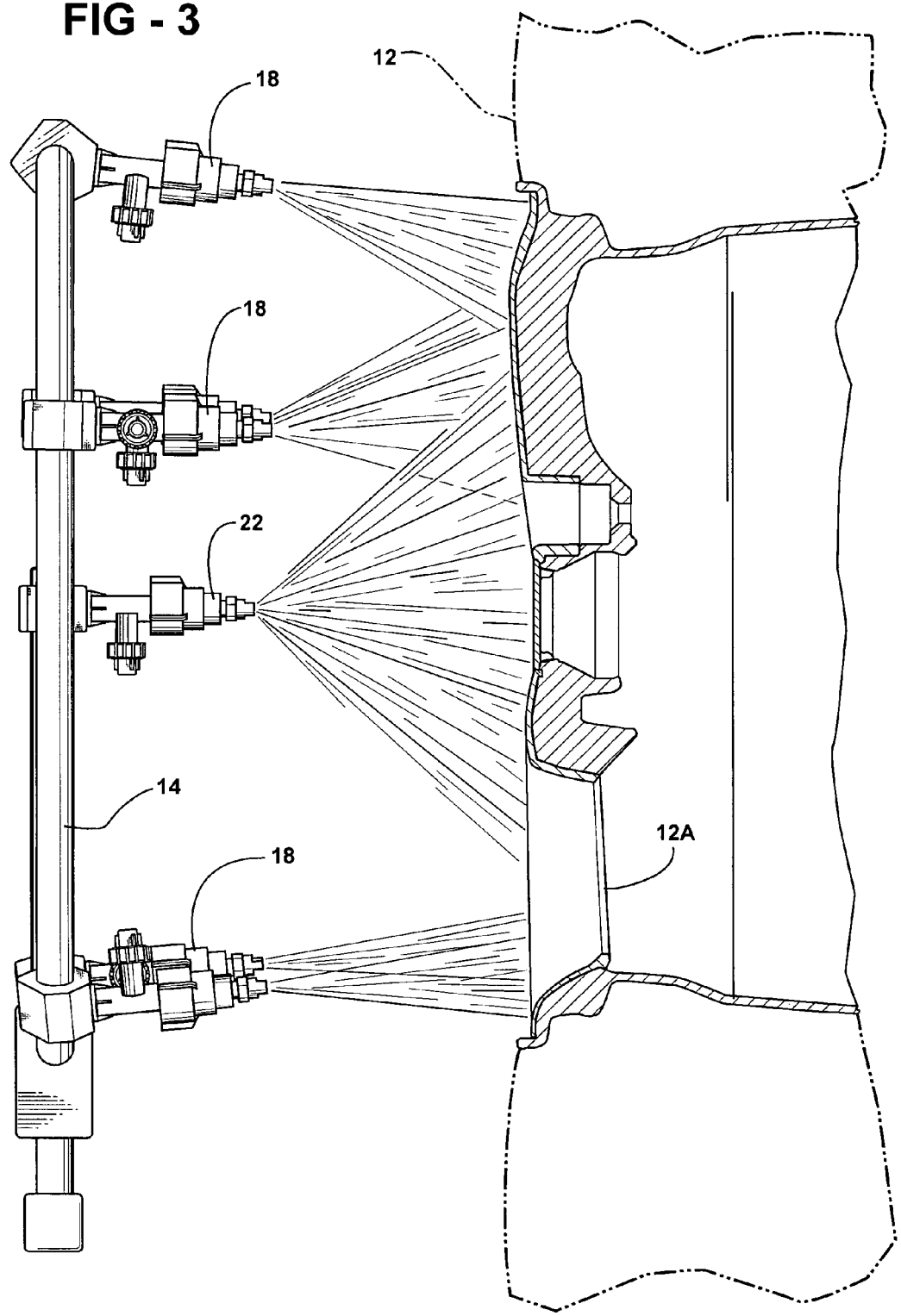
FIG. 3 is a side view of the wheel washer again showing the spray pattern impacting a wheel in laterally spaced relationship to the washer.

Referring to the figures, a wheel washer assembly 10 disposed laterally adjacent an automotive wheel 12 to be cleaned is shown to comprise a circular fluid conduit 14 having a diameter in the range of approximately 12 to 20 inches. The conduit 14 is made of a relatively rigid and durable shape-retaining material such as PVC or polyethylene or metals such as stainless steel. Both ends of the conduit are open and in fluid communication with the interior of a foaming chamber 16. The conduit 14 is provided with a plurality of circumferentially spaced outputs (holes) to which spray nozzles 18 are attached by means of clamping structures 20. All of the nozzles 18 provide flat, linear spray patterns which are slightly inwardly aimed to provide a converging pattern as shown in FIGS. 1 and 3. In addition, a center nozzle 22 is mounted on a radial supply tube 24 extending from the chamber 16 toward the center of the conduit 14. A clamp 26 attaches the nozzle 22 to the supply tube 24. The nozzle 22 provides a full 360° outwardly diverging spray pattern.

A fluid supply line 28 is connected through a valve 30 to the chamber 16 and, by virtue of such connection, commonly to the input of the conduit 14 and the supply tube 24 which directs fluid to the center nozzle 22. A supply tube 32 for high pressure air is connected to the chamber 16 through a valve 34. Finally, a porous material 36 is disposed within the chamber 16 to cause a foaming action in the fluid and chemical; i.e., cleaner chemical which is supplied to the conduit 14 and the nozzles 18 attached thereto and to the center nozzle 22.

The nozzles 18 and 22 are commercially available products which can be purchased from Spraying Systems Company, P.O. Box 7900, Wheaton, Ill. 60189. These spray nozzles all include pressure sensitive check valves which are open when the fluid pressure exceeds a predetermined value and close when the pressure drops below that value. The function of the check valves is to prevent dribble and loss of fluid after the high pressure spray cleaning operation is concluded.

The conduit 14, as described above, may be made of various shape-retaining materials including rigid plastics, such as PVC and polyethylene as well as metals including stainless steel. FIG. 4 shows a stainless steel conduit 14 provided with a drilled and tapped hole 38 which is adapted to receive the threaded stem 40 of a nozzle 18. Other structures including the clamp structures 20 described above can also be used in the alternative or in combination.

In operation, the wheel washer is stationed essentially permanently in a location adjacent a washing area where vehicles either pass by or are temporarily stopped for the wheel washing operation. The spray may be turned on by opening valves 30 and 34 in response to an infrared vehicle presence detector. The distance between the vertical plane of the washer conduit 14 and the wheel may vary depending on the width of the vehicle and is typically in the range of about eight to 24 inches. One of the advantages of the present invention is that, in the instance of smaller diameter wheels and/or wheels which are spaced somewhat farther than normal from the plane of the conduit 14, the inwardly converging pattern of the nozzles 18 tends to create an interference effect with the outwardly diverging spray pattern from the 360° nozzle 22 so as to effectively contain the outward spray and prevent the chemical which is contained therein from reaching the painted metal surfaces of the automobile to which the wheel 12 is attached. FIG. 3 shows typical spacing between the stylized alloy rim 12A of the wheel 12 and the plane of the conduit 14. It will be noted that the wheel receives both outwardly diverging and inwardly converging spray patterns so as to effectively cause direct contact between the cleaning chemical and all surfaces of the alloy rim 12A.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A spray-type wheel washer for automobiles comprising:
    a circular conduit having a fluid input and a plurality of spaced outputs;
    the diameter of said conduit being in the range of approximately 12 to 20 inches so as to approximate the diameter of an automotive vehicle wheel;
    a plurality of spray nozzles connected to said outputs and having commonly laterally directed spray patterns which are inwardly angled toward the center of said conduit;
    a center spray nozzle having an outwardly diverging spray pattern; and
    a fluid supply connected to the conduit input and the center spray nozzle to cause simultaneous fluid flow from all of said nozzles.

2. The wheel washer defined in claim 1 further including means defining a chamber commonly connected to the fluid supply, the conduit input and the center spray nozzle.

3. The wheel washer defined in claim 2 further comprising porous material disposed in said chamber.

4. The wheel washer defined in claim 3 further comprising an air supply connected to said chamber means.

5. The wheel washer defined in claim 1 wherein the conduit is made of plastic.

6. The wheel washer defined in claim 5 wherein a plurality of spray nozzles are clamped to the conduit.

7. The wheel washer defined in claim 1 wherein the conduit is made of metal.

8. The conduit defined in claim 7 wherein the plurality of spray nozzles are connected to tapped holes defining the conduit outlet.

9. The wheel washer defined in claim 1 wherein said nozzles include pressure responsive check valves to open in response to fluid pressure in excess of a predetermined amount and closed when the fluid pressure is less than said predetermined amount.

10. The wheel washer defined in claim 1 wherein the plurality of nozzles and said center nozzle are inwardly converging and outwardly diverging, respectively, so as to create an interference pattern at a predetermined lateral distance.

11. A wheel washer comprising a circular array of stationary spray nozzles wherein the effective diameter of the array approximates the diameter of a vehicle road wheel, a supply of fluid commonly attached to each nozzle in the array, the nozzles being arranged to produce an inwardly converging pattern of sprayed fluid; and a foaming chamber associated with said commonly attached supply and containing a medium effective to foam the fluid before it is sprayed by said spray nozzles.

12. The wheel washer defined in claim 11 further including a center nozzle disposed centrally of said array and arranged to provide a 360° outwardly diverging spray pattern.

* * * * *